United States Patent
Kim et al.

(10) Patent No.: US 12,391,606 B2
(45) Date of Patent: Aug. 19, 2025

(54) GLASS ARTICLE, DISPLAY DEVICE INCLUDING THE GLASS ARTICLE, AND METHOD OF MANUFACTURING THE GLASS ARTICLE

(71) Applicant: Samsung Display Co., LTD., Yongin-si (KR)

(72) Inventors: Min Ki Kim, Hwaseong-si (KR); Byeong Beom Kim, Asan-si (KR); Seung Ho Kim, Asan-si (KR); Yu Ri Kim, Guri-si (KR); Hoi Kwan Lee, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 874 days.

(21) Appl. No.: 17/222,374

(22) Filed: Apr. 5, 2021

(65) Prior Publication Data

US 2021/0387901 A1  Dec. 16, 2021

(30) Foreign Application Priority Data

Jun. 11, 2020  (KR) ................... 10-2020-0070679

(51) Int. Cl.
*C03C 15/02* (2006.01)
*C03B 23/023* (2006.01)
*C03C 3/093* (2006.01)
*C03C 4/18* (2006.01)
*C03C 21/00* (2006.01)

(52) U.S. Cl.
CPC ............ *C03C 15/02* (2013.01); *C03B 23/023* (2013.01); *C03C 3/093* (2013.01); *C03C 4/18* (2013.01); *C03C 21/002* (2013.01); *C03C 2204/00* (2013.01)

(58) Field of Classification Search
CPC .................................................. C03C 15/02
See application file for complete search history.

(56) References Cited

U.S. PATENT DOCUMENTS

| | | |
|---|---|---|
| 4,911,743 A | 3/1990 | Bagby |
| 6,099,389 A | 8/2000 | Nichols et al. |
| 8,591,612 B2 | 11/2013 | Enomoto et al. |
| 11,203,550 B2 | 12/2021 | Ozeki et al. |
| 11,708,301 B2 | 7/2023 | Lee et al. |
| 2005/0142321 A1 | 6/2005 | Miyahara et al. |

(Continued)

FOREIGN PATENT DOCUMENTS

| | | |
|---|---|---|
| CN | 106232541 | 12/2016 |
| CN | 106698974 | 5/2017 |

(Continued)

OTHER PUBLICATIONS

Tayyab I. Suratwala et al., "HF-Based Etching Processes for Improving Laser Damage Resistance of Fused Silica Optical Surfaces", Journal of the American Ceramic Society, Feb. 14, 2011, pp. 416-428, vol. 94, No. 2, XP055359965.

(Continued)

*Primary Examiner* — Prashant J Khatri
(74) *Attorney, Agent, or Firm* — KILE PARK REED & HOUTTEMAN PLLC

(57) ABSTRACT

A glass article includes a flat portion and a side portion extending from the flat portion and bent in a thickness direction of the glass article, a base disposed on the flat portion and the side portion; and a Beilby layer disposed on the flat portion and not disposed on at least a part of the side portion.

15 Claims, 26 Drawing Sheets

(56) References Cited

U.S. PATENT DOCUMENTS

| | | | |
|---|---|---|---|
| 2008/0213626 A1 | 9/2008 | Kobayashi et al. |
| 2014/0309097 A1 | 10/2014 | Hochrein et al. |
| 2019/0330103 A1 | 10/2019 | Ozeki et al. |
| 2023/0303435 A1 | 9/2023 | Lee et al. |

FOREIGN PATENT DOCUMENTS

| | | |
|---|---|---|
| CN | 110156337 | 8/2019 |
| CN | 110407460 | 11/2019 |
| JP | 2017-529304 | 10/2017 |
| KR | 10-2008-0056020 | 6/2008 |

OTHER PUBLICATIONS

Extended European search report for European Patent Application or Patent No. 21179061.3 dated Nov. 24, 2021.

Li, Yanrong, "Introduction to Materials Physics", Chapter 2 Surfaces and Interface of Materials, p. 93, Tsinghua University Press, May 2001, 4 total pages, First Edition.

FIG. 8

|  | BDT | | EIT | |
| --- | --- | --- | --- | --- |
|  | Median[cm] | B10[cm] | Median[J] | B10[J] |
| Ref. | 25 | 19.96 | 1.1 | 0.57 |
| Ref.+Etching | 95 | 78.14 | 3.5 | 0.58 |
| Ref.+Etching+ Beilby Formation(1) | 50 | 34.57 | 3.0 | 1.17 |
| Ref.+Etching+ Beilby Formation(2) | 67.5 | 48.23 | 4.7 | 3.26 |

GLASS ARTICLE, DISPLAY DEVICE INCLUDING THE GLASS ARTICLE, AND METHOD OF MANUFACTURING THE GLASS ARTICLE

CROSS-REFERENCE TO RELATED APPLICATION(S)

This application claims priority to and the benefit of Korean Patent Application No. 10-2020-0070679 under 35 U.S.C. § 119, filed in the Korean Intellectual Property Office (KIPO) on Jun. 11, 2020, the entire contents of which are incorporated herein by reference.

BACKGROUND

1. Technical Field

The disclosure relates to a glass article, a display device including the glass article, and a method of manufacturing the glass article.

2. Description of the Related Art

Glass articles are widely used in electronic devices including display devices or construction materials. For example, a glass article is applied to a substrate of a flat panel display device such as a liquid crystal display (LCD), an organic light emitting display (OLED) and an electrophoretic display (EPD), or a cover window for protecting it.

As portable electronic devices such as smartphones and tablet PCs have become popular, glass articles applied to them are frequently exposed to external impacts. Accordingly, it is required to develop a glass article which is thin for portability and can withstand external impacts.

SUMMARY

Aspects of the disclosure provide a glass article with reinforced strength and improved scratch resistance.

Aspects of the disclosure also provide a display device including a glass article with reinforced strength and improved scratch resistance.

Aspects of the disclosure also provide a method of manufacturing a glass article having reinforced strength and improved scratch resistance.

However, aspects of the present disclosure are not restricted to those set forth herein. The above and other aspects of the disclosure will become more apparent to one of ordinary skill in the art to which the present disclosure pertains by referencing the detailed description of the disclosure given below.

According to an embodiment, a glass article may comprise a flat portion and a side portion extending from the flat portion and bent in a thickness direction of the glass article, a base disposed on the flat portion and the side portion; and a Beilby layer disposed on the flat portion and not disposed on at least a part of the side portion.

A bending angle of the side portion may be an obtuse angle.

The flat portion may include a first surface, and a second surface opposite to the first surface, the side portion may include a third surface connected to the first surface, and a fourth surface connected to the second surface, and the Beilby layer may be directly disposed on the first surface and the second surface.

At least one of the first surface and the second surface of the flat portion may include at least one first crack indented in the thickness direction of the glass article, and the Beilby layer may fill the at least one first crack.

A refractive index of the Beilby layer may be greater than a refractive index of the base.

At least one of the third surface and the fourth surface of the side portion may include at least one second crack indented in the thickness direction of the glass article.

The side portion may include a first side portion adjacent to the flat portion; a second side portion connected to the first side portion and including at least one second crack; and a third side portion connected to the second side portion and including at least one second crack. The Beilby layer may overlap a part of the first side portion. The at least one second crack of the second side portion and the at least one second crack of the third side portion may be exposed to an outside.

A width of the at least one first crack of the flat portion may be in a range of about 0.05 mm to about 0.15 mm, a length of the at least one first crack may be equal to or less than about 5 mm, the at least one first crack may comprise five or less first cracks, and each of a width of the at least one second crack of the second side portion and a width of the at least one second crack of the third side portion may be greater than about 0.15 mm, each of a length of the at least one second crack of the second side portion and a length of the at least one second crack of the third side portion may be greater than about 5 mm, and the at least one second crack may comprise two or more second cracks.

The Beilby layer may include cerium (Ce).

A result of a ball drop test (BDT) on the glass article with a ball weight of 150 g is equal to or greater than about 35 cm.

A result of a ball drop test (BDT) on the glass article with a ball weight of 150 g is in a range of about 50 cm to about 80 cm.

According to another embodiment, a method of manufacturing a glass article may comprise preparing a mother glass; machining the mother glass to form a machined glass; thermoforming the machined glass to form a thermoformed glass including a flat portion, and a side portion extending from the flat portion; performing a primary polishing process on the thermoformed glass to form a polished glass; etching the polished glass to form an etched glass including the flat portion; and performing a secondary polishing process on the flat portion of the etched glass.

A bending angle of the side portion may be an obtuse angle.

The performing of the primary polishing process may comprise polishing the flat portion and the side portion.

The performing of the primary polishing process may comprise forming a first layer on a surface of the flat portion and a surface of the side portion, and the first layer may include cerium (Ce).

The method may further comprise after the performing of the primary polishing process, forming at least one first crack on the surface of the flat portion, the at least one first crack including a first-first crack and a first-second crack smaller than the first-first crack; and forming at least one second crack on the surface of the side portion, the at least one second crack including a second-first crack and a second-second crack smaller than the second-first crack.

The method may further comprise after the etching, decreasing a size of each of the at least one first crack and at least one second crack and removing the first layer to expose the first-first crack and the second-first crack.

The performing of the secondary polishing process may comprise forming a second layer on the surface of the flat portion; and filling the at least one first crack with the second layer.

The method may further comprise after the secondary polishing process, performing a quality inspection step; and if the at least one first crack of the flat portion detected in the quality inspection step does not satisfy a first condition, performing the secondary polishing process again. The first condition may be that in a scratch inspection, a width of the at least one first crack may be in a range of about 0.05 mm to about 0.15 mm, a length of the at least one first crack may be equal to or less than about 5 mm, and a number of the at least one first cracks may be equal to or less than five.

According to still another embodiment, a display device may comprise a glass article including a flat portion and a side portion extending from the flat portion and bent in a thickness direction of the glass article; and a display panel disposed on the flat portion and the side portion of the glass article. The glass article may include a base disposed on the flat portion and the side portion of the glass article, and a Beilby layer disposed on the flat portion of the glass article and not disposed on at least a part of the side portion of the glass article.

In a glass article, a display device, and a method of manufacturing the glass article in accordance with an embodiment, scratch resistance can be improved, and strength can be reinforced.

The effects of the disclosure are not limited to the aforementioned effects and may include various other effects including those disclosed therein.

BRIEF DESCRIPTION OF THE DRAWINGS

The above and other aspects and features of the disclosure will become more apparent by describing in detail exemplary embodiments thereof with reference to the attached drawings, in which:

FIG. 8 is a table illustrating results of a ball drop test (BDT) and an edge impact test (EIT) on glass articles according to an embodiment;

DETAILED DESCRIPTION OF THE EMBODIMENTS

Figure 1:
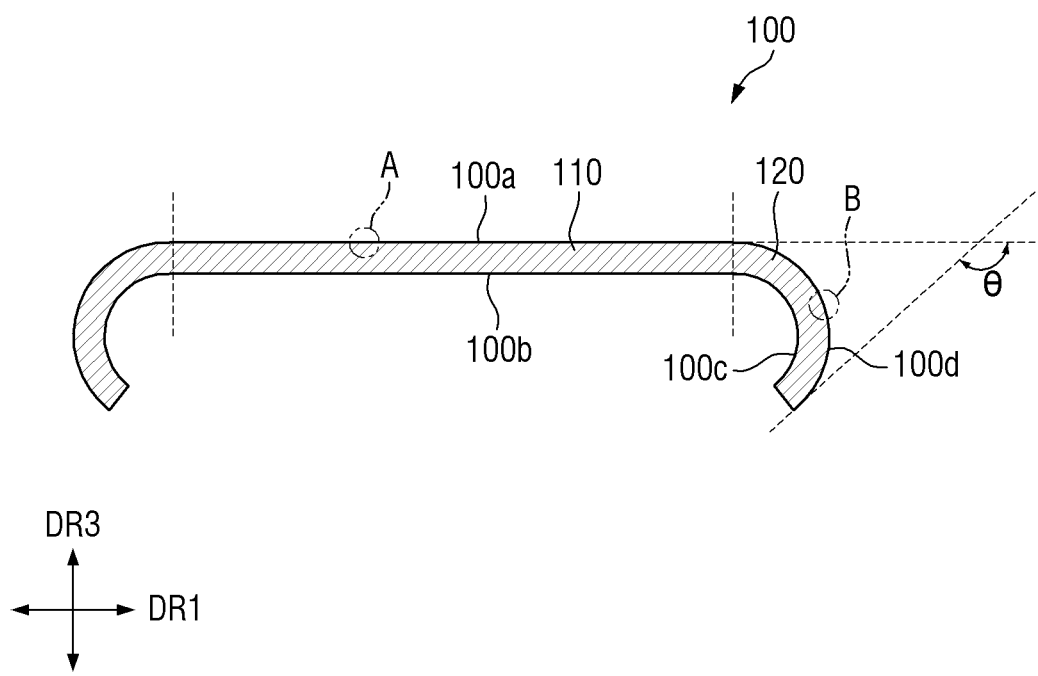
FIG. 1 is a schematic cross-sectional view of a glass article according to an embodiment.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention. That is, the invention is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" or the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." The term "or" may mean "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly defined herein.

Some embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as being limited to the particular shapes of regions as illustrated herein but are to include deviations in shapes that result, for example, from manufacturing. For example, a region illustrated or described as being flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments will be described with reference to the attached drawings.

FIG. 1 is a schematic cross-sectional view of a glass article 100 according to an embodiment.

Glass may be used as a cover window for protecting a display, a substrate for a display panel, a substrate for a touch panel, an optical member such as a light guide plate and the like in electronic devices including a display such as a tablet PC, a laptop PC, a smartphone, an electronic book, a television, and a PC monitor as well as a refrigerator and a cleaning or washing machine including a display screen. Glass may also be employed as cover glass for a dashboard of a vehicle, a cover glass for solar cells, interior materials for construction materials, windows for buildings and houses, and the like.

Referring to FIG. 1, in an embodiment, the glass article 100 may include a glass composition. The glass composition of the glass article 100 may include various compositions known in the art. In an embodiment, the glass composition may include LAS glass ceramics containing lithium aluminosilicate. For example, the glass composition may contain about 50 to about 80 mol % of $SiO_2$, about 1 to about 30 mol % of $Al_2O_3$, about 0 to about 5 mol % of $B_2O_3$, about 0 to about 4 mol % of $P_2O_5$, about 3 to about 20 mol % of $Li_2O$, about 0 to about 20 mol % of $Na_2O$, about 0 to about 10 mol % of $K_2O$, about 3 to about 20 mol % of MgO, about 0 to about 20 mol % of CaO, about 0 to about 20 mol % of SrO, about 0 to about 15 mol % of BaO, about 0 to about 10 mol % of ZnO, about 0 to about 1 mol % of $TiO_2$, and about 0 to about 8 mol % of $ZrO_2$.

The phrase "the content is 0 mol %" as used herein means that it does not substantially contain the corresponding component. The phrase a composition "does not substantially contain" a certain component as used herein means that the certain component is not intentionally contained in raw materials and the like and may include, for example, a case in which a tiny amount (e.g., equal to or less than about 0.1 mol %) of impurities are inevitably contained.

In more detail with respect to each component of the glass composition, $SiO_2$ may form the skeleton of glass, may increase the chemical durability, and may reduce the occurrence of cracks in case that scratches (indentations) are made on the glass surface. To perform this function, $SiO_2$ may be contained in an amount equal to or greater than about 50 mol %. To have sufficient meltability, the content of $SiO_2$ in the glass composition may be equal to or less than about 80 mol %.

$Al_2O_3$ may improve the breakage resistance of glass. For example, $Al_2O_3$ may generate a smaller number of fragments in case that the glass is broken. $Al_2O_3$ may serve as an active component that improves ion exchange performance during chemical strengthening and increases surface compressive stress after strengthening. In case that the content of $Al_2O_3$ is equal to or greater than about 1 mol %, the above-described functions can be effectively performed. To maintain the acid resistance and meltability of glass, the content of $Al_2O_3$ may be equal to or less than about 30 mol %.

$B_2O_3$ may enhance the chipping resistance of glass and improve the meltability of glass. $B_2O_3$ may not be contained (about 0 mol %). $B_2O_3$ may further improve the meltability of glass in case that it is contained in an amount equal to or greater than about 0.5 mol %. The content of $B_2O_3$ equal to or less than about 5 mol % may be advantageous in suppressing the occurrence of striae during melting.

$P_2O_5$ may improve the ion exchange performance and chipping resistance. $P_2O_5$ may not be contained (e.g., about 0 mol %). $P_2O_5$ may significantly perform the above-described functions in case that it is contained in an amount equal to or greater than about 0.5 mol %. The content of $P_2O_5$ equal to or less than about 4 mol % may be advantageous in preventing a significant decrease in breakage resistance and acid resistance.

$Li_2O$ may form surface compressive stress by ion exchange. Li ions near the glass surface may be exchanged with Na ions or the like through an ion exchange process. $Li_2O$ may also improve the breakage resistance of glass. The content of $Li_2O$ for effective ion exchange may be equal to or greater than about 3 mol %, and the content of $Li_2O$ may be equal to or less than about 20 mol % or less for acid resistance.

$Na_2O$ may form surface compressive stress by ion exchange and improve the meltability of glass. Na ions near the glass surface may be exchanged with K ions or the like through an ion exchange process. $Na_2O$ may not be contained, but if $Na_2O$ is contained, the content of $Na_2O$ may be equal to or greater than about 1 mol % to effectively perform the above-described functions. If only a Li and Na ion exchange process is performed without a K ion exchange process, the content of $Na_2O$ may be equal to or less than about 8 mol % for smooth exchange of Li and Na ions. If the K ion exchange process is also performed, a larger amount of $Na_2O$ may be used. In this case, the content of $Na_2O$ may be equal to or less than about 20 mol % for acid resistance.

$K_2O$ may improve the ion exchange performance and may be associated with the breakage resistance. $K_2O$ may not be contained or may be contained in an amount equal to or greater than about 0.5 mol % to improve the ion exchange performance. To prevent an excessive decrease in breakage resistance, the content of $K_2O$ may be equal to or less than about 10 mol %.

MgO may increase the surface compressive stress and improve the breakage resistance of chemically strengthened glass. These functions may be effectively performed in case that the content of MgO is equal to or greater than about 3 mol %. The content of MgO equal to or less than about 20 mol % may be advantageous in reducing the occurrence of devitrification during glass melting.

CaO may improve the meltability and breakage resistance of glass. CaO may not be contained. The content of CaO may be equal to or greater than 0.5 mol % to perform these functions. If the content of CaO is excessively high, the ion exchange performance may be degraded, and thus, the content of CaO may be equal to or less than about 20 mol %.

Similar to CaO, SrO may improve the meltability and breakage resistance of glass. SrO may not be contained. The content of SrO may be equal to or greater than about 0.5 mol % to perform these functions. If the content of SrO is excessively high, the ion exchange performance may be degraded, and thus, the content of SrO may be equal to or less than about 20 mol %.

BaO may improve the meltability and breakage resistance of glass. BaO may not be contained. The content of BaO may be equal to or greater than about 0.5 mol % to perform these functions. The content of BaO equal to or less than about 15 mol % may be advantageous in preventing an excessive decrease in ion exchange performance.

ZnO may improve the meltability of glass. ZnO may not be contained. ZnO may significantly exhibit the effect of improving meltability in case that the content of ZnO is equal to or greater than about 0.25 mol %. To prevent a decrease in weatherability, the content of ZnO may be equal to or less than about 10 mol %.

$TiO_2$ may improve the breakage resistance of chemically strengthened glass. $TiO_2$ may not be contained. $TiO_2$ may significantly exhibit the effect of improving breakage resistance in case that the content of $TiO_2$ is equal to or greater than about 0.1 mol %. To prevent devitrification during melting, the content of $TiO_2$ may be equal to or less than about 1 mol %.

$ZrO_2$ may increase the surface compressive stress due to ion exchange and improve the breakage resistance of glass. $ZrO_2$ may not be contained. $ZrO_2$ may effectively perform these functions in case that the content of $ZrO_2$ is equal to or greater than about 0.5 mol %. The content of $ZrO_2$ equal to or less than about 8 mol % may be advantageous in suppressing devitrification during melting.

The glass composition may further include components such as $Y_2O_3$, $La_2O_3$, $Nb_2O_5$, $Ta_2O_5$ and $Gd_2O_3$ in addition to the components mentioned above. The composition of the glass article 100 may be changed through an ion exchange process or a thermoforming process, which will be described below.

The glass article 100 may include a flat portion 110 and side portions 120 extending from the flat portion 110.

The flat portion 110 may extend, for example, in a first direction DR1. The flat portion 110 may be slightly inclined in a thickness direction (for example, a third direction DR3), but may be visually recognized to substantially have a cross-sectional shape of a straight line extending in the first direction DR1.

The side portions 120 may extend from the flat portion 110. The side portions 120 may be connected to the flat portion 110. The respective side portions 120 may extend from a side (for example, the right side in the cross-sectional view of FIG. 1) of the flat portion 110 in the first direction DR1 and extend from the other side (for example, the left side in the cross-sectional view of FIG. 1) of the flat portion 110 in the first direction DR1.

Unlike the flat portion 110, the side portions 120 may be bent in the third direction DR3. The side portions 120 may be bent from the flat portion 110. A bending angle θ of the side portion 120 may be defined as follows. The bending angle θ may be defined as a crossing angle between an extension line of a surface (first surface 100a described below) of the flat portion 110 and a tangent line at an end portion (end of the side portion 120 spaced from the flat portion 110) of the outer surface (fourth surface 100d described later) of the side portion 120. With respect to a crossing point between the extension line of the surface (first surface 100a described below) of the flat portion 110 and the tangent line at the end portion (end of the side portion 120 spaced from the flat portion 110) of the outer surface (fourth surface 100d described below) of the side portion 120, the bending angle θ may be defined as an angle between the extension line of the surface (first surface 100a described below) of the flat portion 110, which extends to the right side of the first direction DR1 from the crossing point, and a straight line which extends to the crossing point from a point of contact at the end portion (end of the side surface 120 spaced from the flat portion 110) of the outer surface (fourth surface 100d described below) of the side portion 120.

The bending angle θ of the glass article 100 according to an embodiment may be an obtuse angle.

As described above, the glass article 100 may include surfaces. The glass article 100 may include the first surface 100a of the flat portion 110, a second surface 100b opposite to the first surface 100a, a third surface 100c that is the inner surface of the side portion 120, and the fourth surface 100d that is the outer surface of the side portion 120. The third surface 100c may be connected to the second surface 100b, and the fourth surface 100d may be connected to the first surface 100a.

In case that the glass article 100 is used as a component of a display device, since the bending angle of the side portion 120 of the glass article 100 according to an embodiment is an obtuse angle, the glass article 100 may be susceptible to damage in case that an impact is applied to the edge portion or the side surface portion of the display device and is transmitted to the side portion 120 of the glass article 100. Therefore, there is a need to reinforce the strength of the glass article 100 in which the bending angle of the side portion 120 is an obtuse angle.

The glass article 100 according to an embodiment may include cracks. Cracks may be formed on at least one of the first surface 100a and the second surface 100b and may be formed on at least one of the third surface 100c and the fourth surface 100d.

Figure 2:
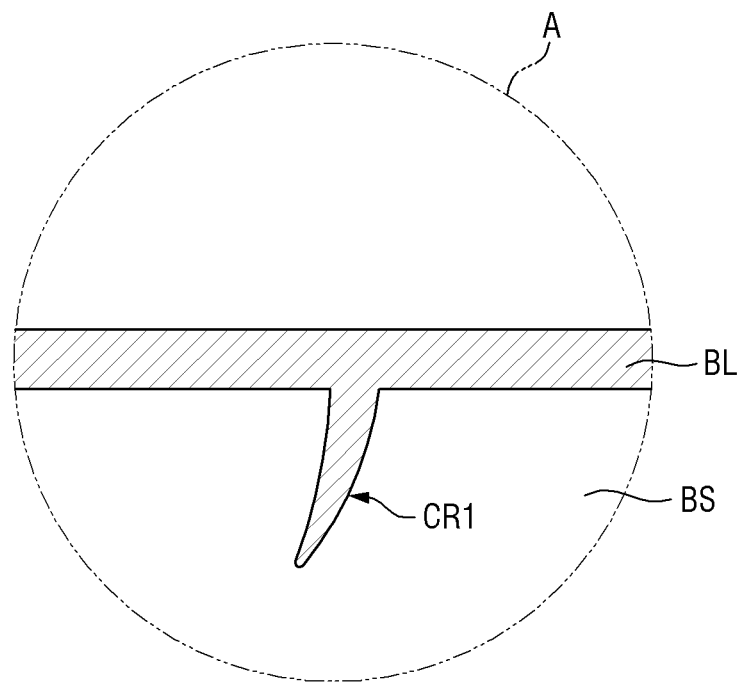
FIG. 2 is a schematic enlarged cross-sectional view of region A of FIG. 1.
Figure 3:
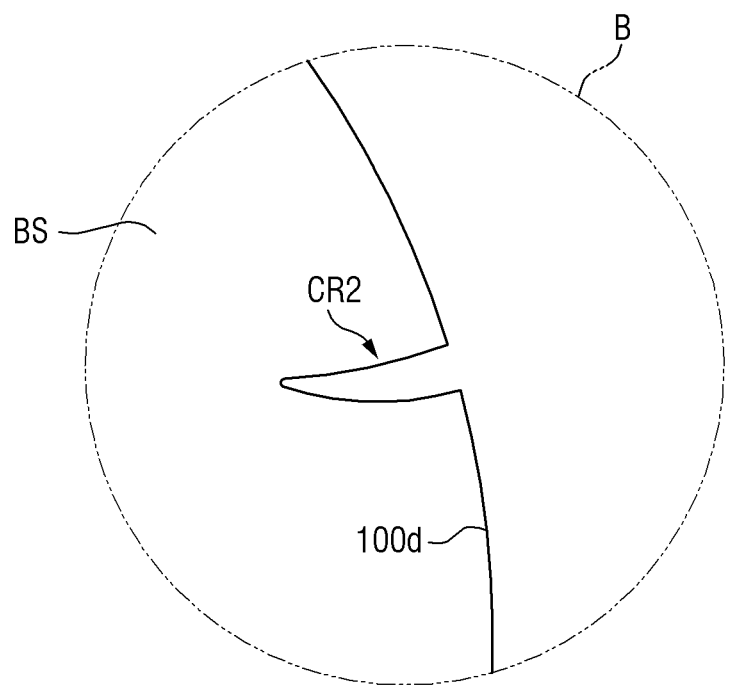
FIG. 3 is a schematic enlarged cross-sectional view of region B of FIG. 1.

FIG. 2 is a schematic enlarged cross-sectional view of region A of FIG. 1. FIG. 3 is a schematic enlarged cross-sectional view of region B of FIG. 1.

Referring to FIGS. 2 and 3, the glass article 100 according to an embodiment may include a base BS and a Beilby layer BL formed on the base BS.

The base BS may include the composition of the glass article 100 described above.

The base BS may include at least one of cracks CR1 and CR2. Referring to FIGS. 2 and 3, the base BS may include a first crack CR1 indented in the thickness direction from the first surface 100a, and a second crack CR2 indented in the thickness direction from the fourth surface 100d. Although not shown, the cracks may be formed on the second surface 100b and the third surface 100c.

The cracks CR1 and CR2 may be formed in a thermoforming process for a glass article or a primary polishing process for a glass article, which will be described below. In addition to the cracks CR1 and CR2, small cracks may be formed in the primary polishing process and the thermoforming process for a glass article. The small cracks may be removed through a subsequent etching process, but the cracks CR1 and CR2 may be visually recognized if not removed.

However, in the case of the glass article 100 according to an embodiment, the Beilby layer BL may be further disposed on the flat portion 110 of the glass article 100 that corresponds to a flat portion of a display panel externally displaying an image, thereby preventing the first crack CR1 from being visually recognized.

The Beilby layer BL may be directly disposed on the first surface 100a. The Beilby layer BL may fill the first crack CR1 of the first surface 100a.

The Beilby layer BL may be formed in a secondary polishing process for a glass article, which will be described below. The Beilby layer BL may be an impurity layer formed by a reaction between the surface of the base BS and cerium (Ce), which is a component of a polishing liquid. The Beilby layer BL may contain cerium (Ce). The Beilby layer BL may have a refractive index greater than that of the base BS. The refractive index of the base BS may be generally about 1.5, and the refractive index of the Beilby layer BL may be greater than that of the base BS. According to an embodiment, the refractive index of the Beilby layer BL may be greater than that of the base BS, and the Beilby layer BL may fill the first crack CR1 that may be visually recognized from the outside, thereby preventing the first crack CR1 from being visually recognized from the outside.

The Beilby layer BL may be disposed on a part of the side portion 120. As described below, the Beilby layer BL may be disposed on a partial region (or at least a part) of the side portion 120 adjacent to the flat portion 110. In a part of the side portion 120 exposed by the Beilby layer BL, the second crack CR2 may be exposed. The Beilby layer BL may be entirely disposed on the flat portion 110, but may not be disposed on a partial region (or at least a part) of the side portion 120 or may be partially disposed on the side portion 120 because the secondary polishing process is performed only on the flat portion 110 of the base BS, and the secondary polishing process is not performed on the side portions 120 of the base BS.

Figure 4:
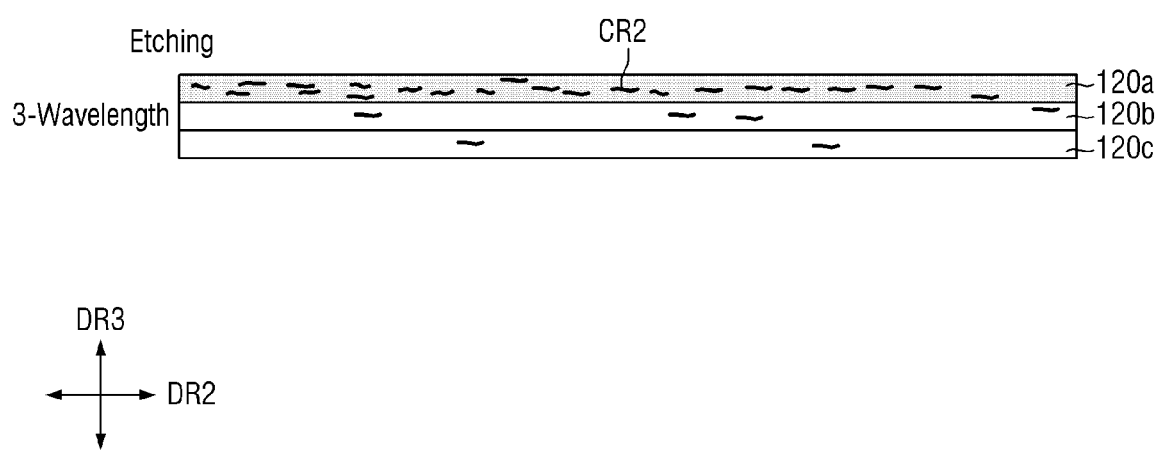
FIG. 4 is a schematic side view of an exemplary glass article.
Figure 5:
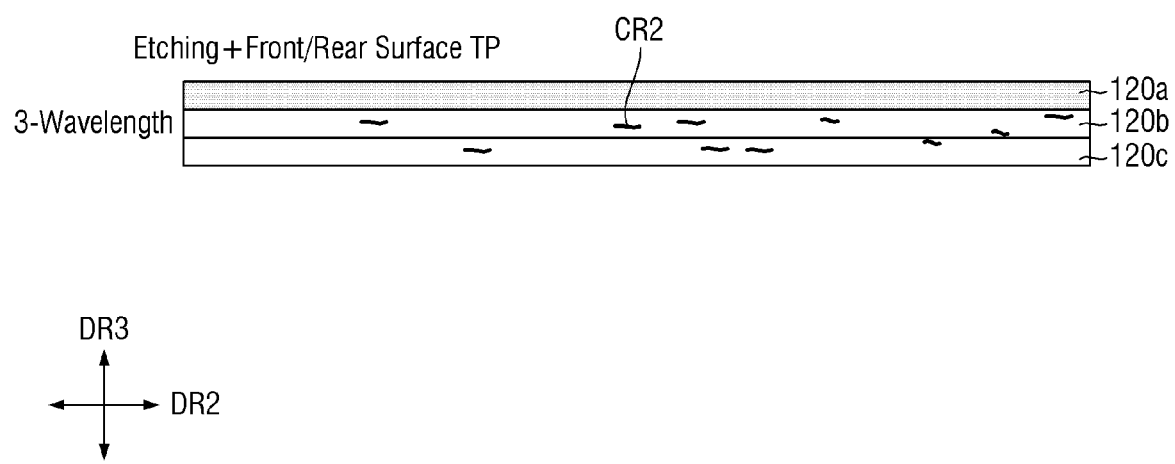
FIG. 5 is a schematic side view of a glass article according to an embodiment.
Figure 6:
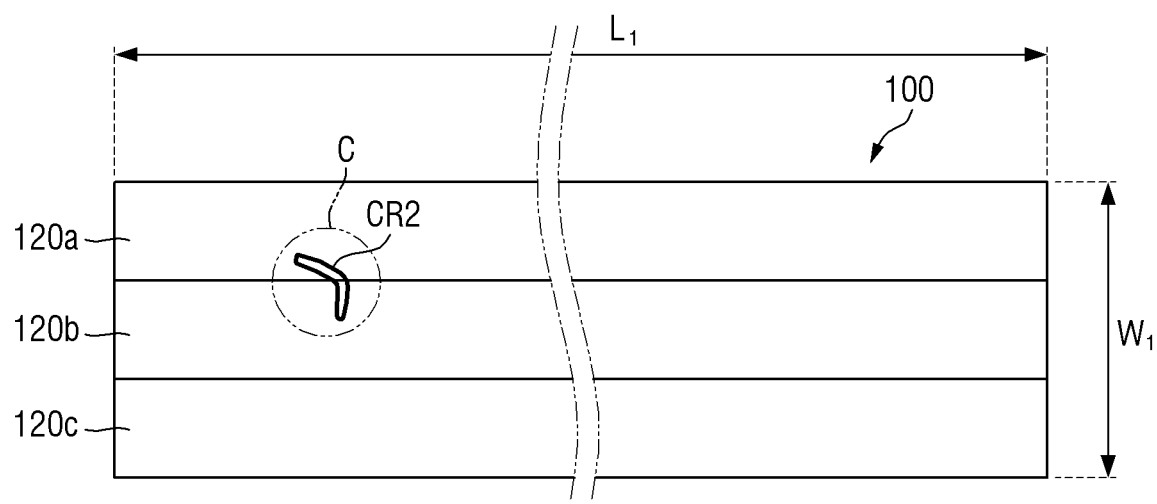
FIG. 6 is a schematic side view of a glass article according to an embodiment.
Figure 6:
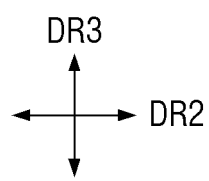
Figure 7:
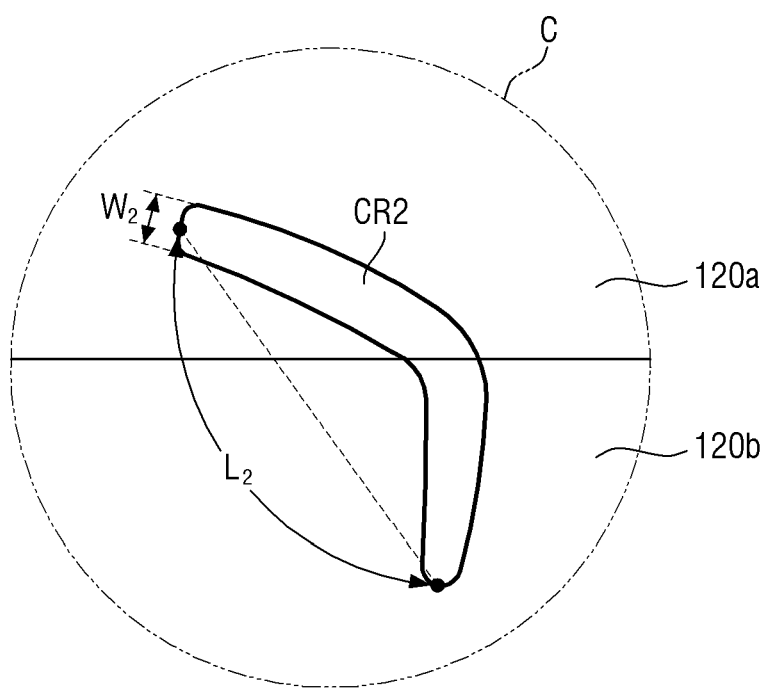
FIG. 7 is a schematic enlarged view of region C of FIG. 6.

FIG. 4 is a schematic side view of the glass article 100 according to an embodiment. FIG. 5 is a schematic side view of a glass article 100 according to an embodiment. FIG. 6 is a schematic side view of a glass article according to an embodiment. FIG. 7 is a schematic enlarged view of region C of FIG. 6. FIG. 4 illustrates a side portion 120 of the glass article 100 in case that an etching process for the glass article 100, which will be described below, is performed and a secondary polishing process is not performed, and FIG. 5 illustrates a side portion of the glass article 100 in case that the secondary polishing process is performed after the etching process.

Referring to FIGS. 4 to 7, as described above, the side portion 120 of the glass article 100 may include multiple regions.

The side portion 120 may include a first side portion 120a adjacent to the flat portion 110, a second side portion 120b connected to the first side portion 120a, and a third side portion 120c connected to the second side portion 120b.

The side portion 120 (first to third side portions 120a, 120b, and 120c) may extend in the second direction DR2.

Since the Beilby layer BL is entirely disposed on the flat portion 110, but is partially disposed on the side portion 120, the second crack CR2 may be exposed in a part of the second crack CR2 exposed by the Beilby layer BL. Thus, as shown in FIG. 4, the second cracks CR2 may be distributed over the side portion 120 (first to third side portions 120a, 120b, and 120c).

In contrast, as shown in FIG. 5, in the case of the glass article 100 according to an embodiment, in the region (first side portion 120a) of the side portion 120 adjacent to the flat portion 110, the first side portion 120a may be polished together during the secondary polishing process for the flat portion 110. Accordingly, the Beilby layer BL may be formed in the second cracks CR2 and on the first side portion 120a by using cerium (Ce) of the polishing liquid so that the second cracks CR2 may be hardly visually recognized.

The shape of the second cracks CR2 may be irregular shapes. Hereinafter, the shape and distribution of the second cracks CR2 will be described with reference to FIGS. 6 and 7.

As illustrated in FIG. 6, the side portion 120 of the glass article 100 may have a first length L1 extending in the second direction DR2 and a first width W1 extending in the third direction DR3. Further, as shown in FIG. 7, the second crack CR2 may have a second length L2 that is the shortest distance between end portions (an end disposed in the first side portion 120a and another end disposed in the second side portion 120b), and a second width W2 which is an average width of the end portions.

The area of the second crack CR2 on the side surface thereof may be defined as a product of the second width W2 and the second length L2. As described above, in the case of the glass article 100 according to an embodiment, in the region (first side portion 120a) of the side portion 120 adjacent to the flat portion 110, since the first side portion 120a may be polished together during the secondary polishing process for the flat portion 110, the Beilby layer BL may be formed in the second cracks CR2 and on the first side portion 120a by using cerium (Ce) of the polishing liquid. Thus, the second cracks CR2 may be hardly visually recognized. Accordingly, the distribution area of the visually recognized second cracks CR2 in each side portion 120a, 120b, 120c may be the smallest in the first side portion 120a.

Figure 9:
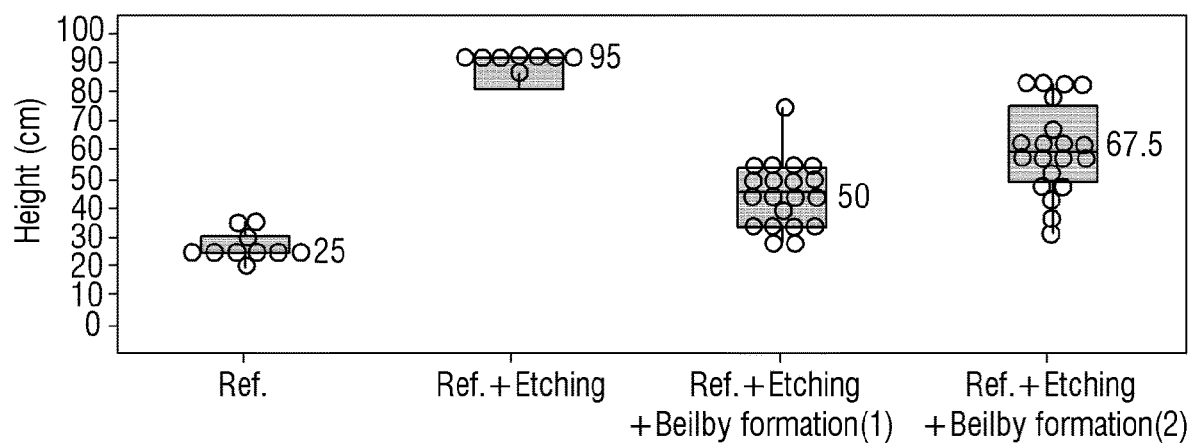
FIG. 9 is a graph showing the BDT results of glass articles according to an embodiment.
Figure 10:
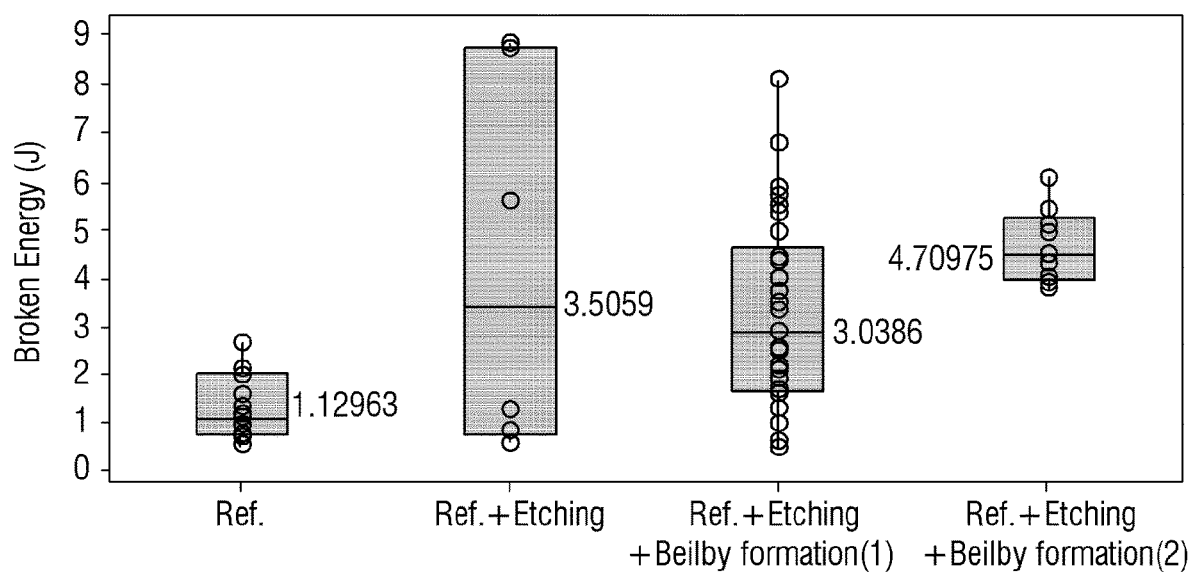
FIG. 10 is a graph showing the EIT results of glass articles according to an embodiment.

FIG. 8 is a table illustrating results of a ball drop test (BDT) and an edge impact test (EIT) on glass articles according to an embodiment. FIG. 9 is a graph showing the BDT results of glass articles according to an embodiment. FIG. 10 is a graph showing the EIT results of glass articles according to an embodiment. The "Ref." of FIG. 8 represents a sample of a glass article in case that only the primary polishing process, which will be described below, was performed and the etching process was not performed. Hereinafter, it is referred to as a first sample. The "Ref.+ etching" of FIG. 8 represents a sample of a glass article in case that the primary polishing process was performed, and then the etching process was performed. Hereinafter, it is referred to as a second sample. The "Ref.+etching+Beilby formation (1)" of FIG. 8 represents a sample of a glass article in case that the primary polishing process and the etching process were subsequently performed, and then the secondary polishing process was performed on the second surface (e.g., a rear surface) of the glass article. Hereinafter, it is referred to as a third sample. The "Ref+etching+Beilby formation (2)" of FIG. 8 represents a sample of a glass article in case that the primary polishing process and the etching process were subsequently performed, and then the secondary polishing process was performed on the first and second surfaces (e.g., front and rear surfaces) of the glass article. Hereinafter, it is referred to as a fourth sample.

The ball drop test (BDT) for a glass article was performed on 10 units of one of the first to fourth samples using a weight of about 150 g. Starting from a height of about 20 cm, the BDT was performed on 10 sample units by increasing by about 5 cm each time and the results were confirmed.

The edge impact test (EIT) for a glass article was performed by applying impacts to edge portions (or side portions) of 10 units of one of the first to fourth samples.

As the results of the BDT, in the case of the first sample, it was confirmed that the dispersion of the BDT results was in a range of about 20 cm to about 30 cm, the median value was about 25 cm, and the average value of the sample units in the bottom 10% (B10) was about 19.96 cm.

In the case of the second sample, it was confirmed that the dispersion of the BDT results was in a range of about 80 cm to about 100 cm, the median value was about 95 cm, and the average value of the sample units in the bottom 10% (B10) was about 78.14 cm.

In the case of the third sample, it was confirmed that the dispersion of the BDT results was in a range of about 35 cm to about 55 cm, the median value was about 50 cm, and the average value of the sample units in the bottom 10% (B10) was about 34.57 cm.

In the case of the fourth sample, it was confirmed that the dispersion of the BDT results was in a range of about 50 cm to about 80 cm, the median value was about 67.5 cm, and the average value of the sample units in the bottom 10% (B10) was about 48.23 cm.

As the results of the EIT, in the case of the first sample, it was confirmed that the dispersion of the EIT results was in a range of about 0.5 J to about 2.2 J, the median value was about 1.1 J, and the average value of the sample units in the bottom 10% (B10) was about 0.57 J.

In the case of the second sample, it was confirmed that the dispersion of the EIT results was in a range of about 0.5 J to about 8.5 J, the median value was about 3.5 J, and the average value of the sample units in the bottom 10% (B10) was about 0.58 J.

In the case of the third sample, it was confirmed that the dispersion of the EIT results was in a range of about 1.5 J to about 4.5 J, the median value was about 3.0 J, and the average value of the sample units in the bottom 10% (B10) was about 1.17 J.

In the case of the fourth sample, it was confirmed that the dispersion of the EIT results was in a range of about 4 J to about 5 J, the median value was about 4.7 J, and the average value of the sample units in the bottom 10% (B10) was about 3.26 J.

According to the glass article 100 (third or fourth sample of FIGS. 8 to 10) in accordance with an embodiment, it was confirmed that the strength (e.g., BDT result) was reduced compared to the second sample which was subjected to the primary polishing process and the etching process.

As described above, the cracks CR1 and CR2 may be formed in the primary polishing process for a glass article or the thermoforming process for a glass article. In addition to the cracks CR1 and CR2, small cracks may be formed in the primary polishing process and the thermoforming process for a glass article. The small cracks may be removed through the subsequent etching process, but the cracks CR1 and CR2 may be visually recognized if not removed.

However, in the case of the glass article 100 according to an embodiment, the Beilby layer BL may be further disposed on the flat portion 110 of the glass article 100 which corresponds to a flat portion of a display panel externally displaying an image, thereby preventing the first crack CR1 from being visually recognized.

The Beilby layer BL may be directly disposed on the first surface 100a. The Beilby layer BL may fill the first crack CR1 of the first surface 100a.

The Beilby layer BL may be formed in the secondary polishing process for a glass article. The Beilby layer BL may be an impurity layer formed by a reaction between the surface of the base BS and cerium (Ce), which is a component of the polishing liquid. The Beilby layer BL may contain cerium (Ce). The Beilby layer BL may have the refractive index greater than that of the base BS. The refractive index of the base BS may be generally about 1.5, and the refractive index of the Beilby layer BL may be greater than that of the base BS. According to an embodiment, the refractive index of the Beilby layer BL may be greater than that of the base BS, and the Beilby layer BL may fill the first crack CR1 that may be visually recognized from the outside, thereby preventing the first crack CR1 from being visually recognized from the outside.

Hereinafter, a method of manufacturing a display device according to an embodiment will be described. In the following embodiment, the same components as those of the above-described embodiment are denoted by the same reference numerals, and a description thereof will be omitted or simplified.

Figure 11:
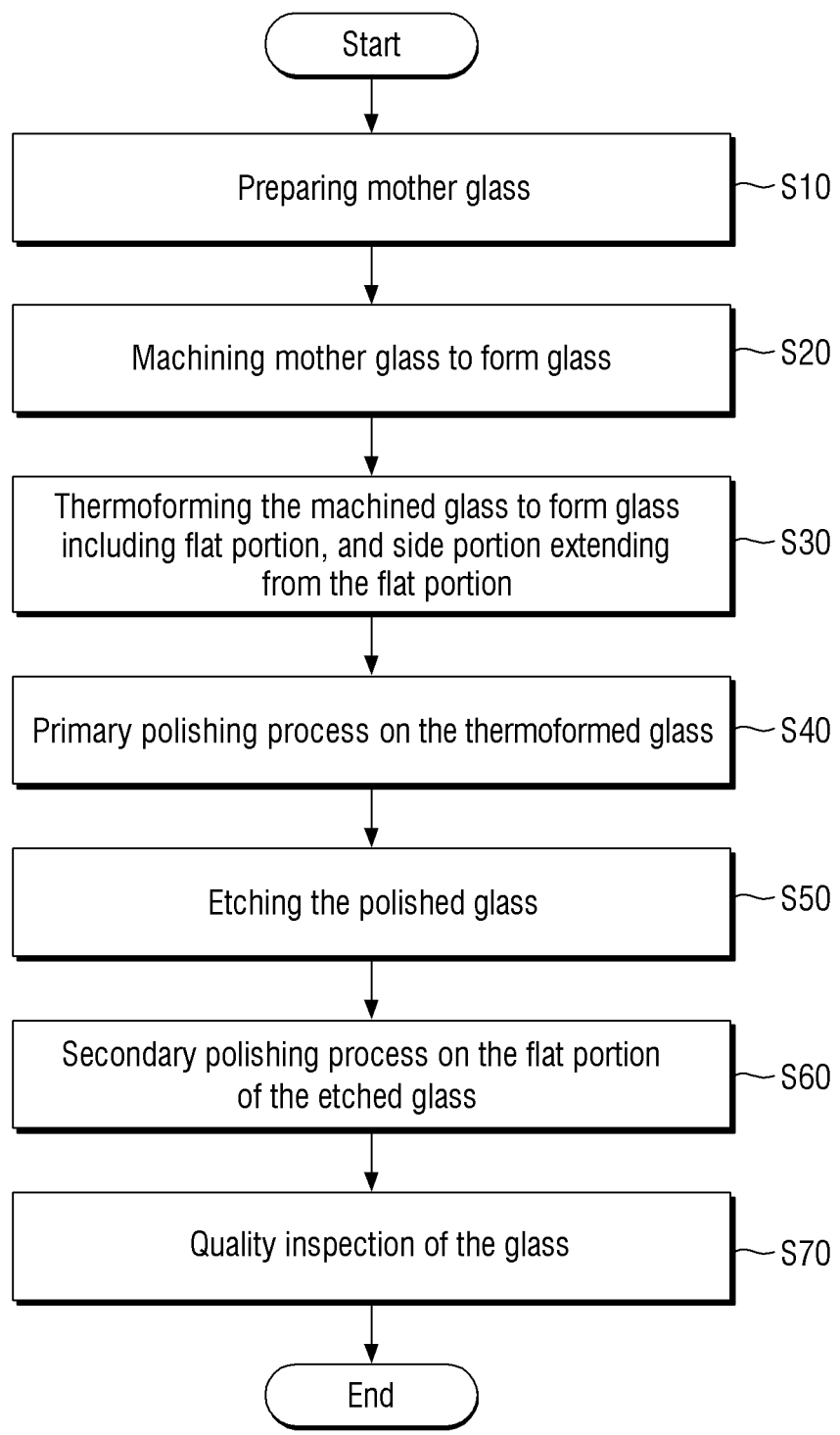
FIG. 11 is a schematic flowchart illustrating a method of manufacturing a glass article according to an embodiment.
Figure 12:
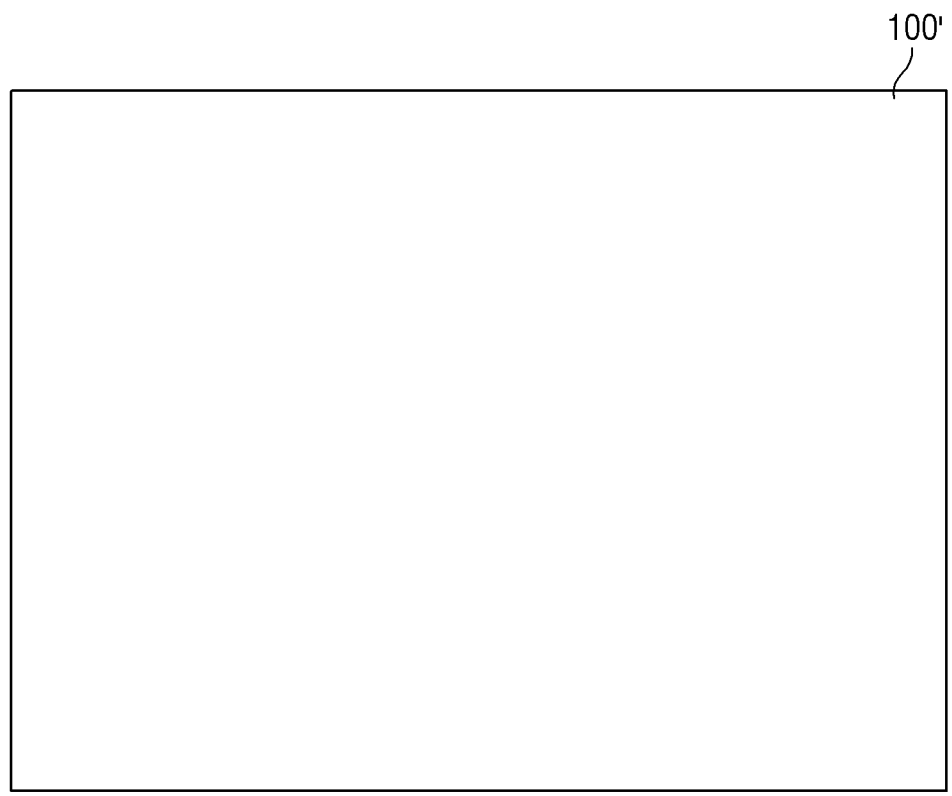
FIGS. 12 and 13 are schematic plan views illustrating processing steps of the method of manufacturing a glass article according to an embodiment.
Figure 12:
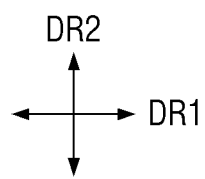
Figure 13:
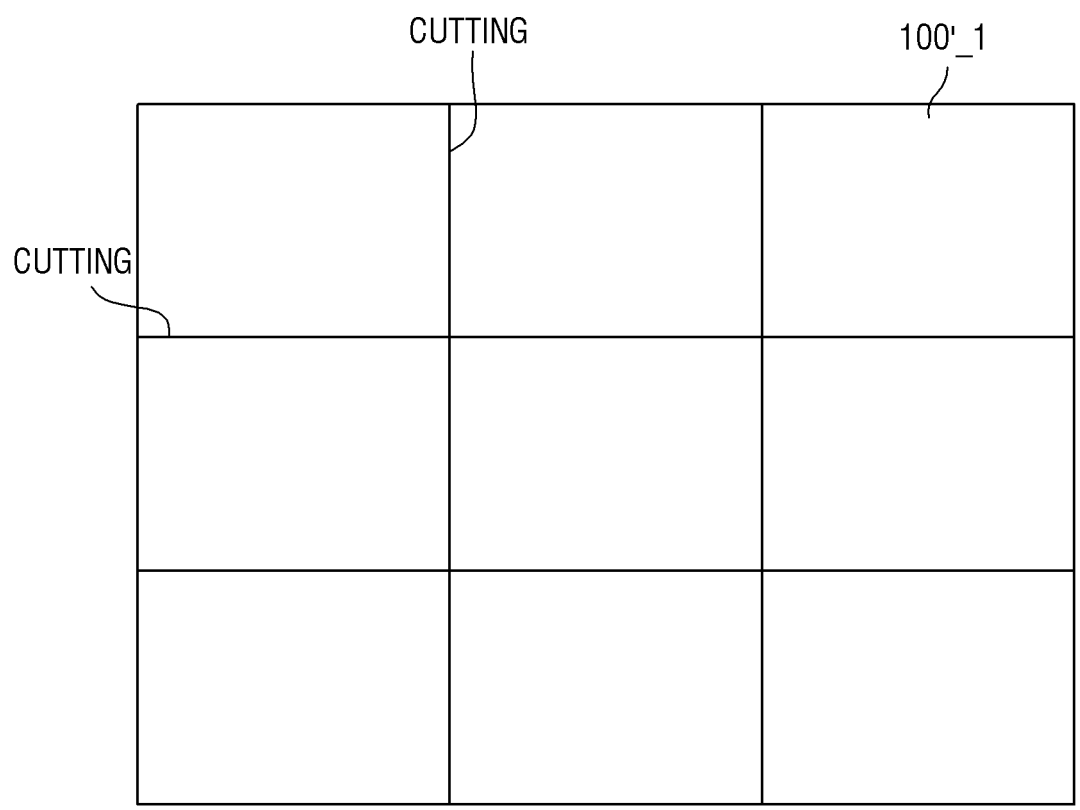

FIG. 11 is a schematic flowchart illustrating a method of manufacturing a glass article according to an embodiment. FIGS. 12 and 13 are schematic plan views illustrating processing steps of the method of manufacturing a glass article according to an embodiment. FIGS. 14, 20, 22, and 25 are schematic cross-sectional views illustrating processing steps of the method of manufacturing a glass article according to an embodiment. FIG. 15 is a schematic enlarged cross-sectional view of region D of FIG. 14. FIGS. 16 to 19, 23, and 24 are schematic perspective views illustrating processing steps of the method of manufacturing a glass article according to an embodiment. FIG. 21 is a schematic enlarged cross-sectional view of region E of FIG. 20.

Referring to FIGS. 11 and 12, a mother glass 100' is prepared first (step S10).

The mother glass 100' may include the glass composition, as described above. The glass composition of the mother glass 100' may include various compositions known in the art. In an embodiment, the glass composition may include LAS glass ceramics containing lithium aluminosilicate. For example, the glass composition may contain about 50 to about 80 mol % of $SiO_2$, about 1 to about 30 mol % of $Al_2O_3$, about 0 to about 5 mol % of $B_2O_3$, about 0 to about 4 mol % of $P_2O_5$, about 3 to about 20 mol % of $Li_2O$, about 0 to about 20 mol % of $Na_2O$, about 0 to about 10 mol % of $K_2O$, about 3 to about 20 mol % of MgO, about 0 to about 20 mol % of CaO, about 0 to about 20 mol % of SrO, about 0 to about 15 mol % of BaO, about 0 to about 10 mol % of ZnO, about 0 to about 1 mol % of $TiO_2$, and about 0 to about 8 mol % of $ZrO_2$.

In more detail with respect to each component of the glass composition, $SiO_2$ may form the skeleton of glass, may increase the chemical durability, and may serve to reduce the occurrence of cracks in case that scratches (indentations) are made on the glass surface. To perform these functions, $SiO_2$ may be contained in an amount equal to or greater than about 50 mol %. To exhibit sufficient meltability, the content of $SiO_2$ in the glass composition may be equal to or less than about 80 mol %.

$Al_2O_3$ may improve the breakage resistance of glass. For example, $Al_2O_3$ may serve to generate a smaller number of fragments in case that the glass is broken. $Al_2O_3$ may function as an active component that improves ion exchange performance during chemical strengthening and increases surface compressive stress after strengthening. In case that the content of $Al_2O_3$ is equal to or greater than about 1 mol %, the above-described functions can be effectively performed. To maintain the acid resistance and meltability of glass, the content of $Al_2O_3$ may be equal to or less than about 30 mol %.

$B_2O_3$ may improve the chipping resistance and meltability of glass. $B_2O_3$ may not be contained (e.g., about 0 mol %). $B_2O_3$ may further improve the meltability of glass in case that the content of $B_2O_3$ is equal to or greater than about 0.5 mol %. The content of $B_2O_3$ equal to or less than about 5 mol % may be advantageous in suppressing the occurrence of striae during melting.

$P_2O_5$ may improve the ion exchange performance and chipping resistance. $P_2O_5$ may not be contained (e.g., about 0 mol %). $P_2O_5$ may perform the above-described functions in case that the content of $P_2O_5$ is equal to or greater than about 0.5 mol %. The content of $P_2O_5$ equal to or less than about 4 mol % may be advantageous in preventing a significant decrease in breakage resistance and acid resistance.

$Li_2O$ may form surface compressive stress by ion exchange. Li ions near the glass surface may be exchanged with Na ions or the like through an ion exchange process. $Li_2O$ may also improve the breakage resistance of glass. The content of $Li_2O$ for effective ion exchange may be equal to or greater than about 3 mol %, and the content of $Li_2O$ may be equal to or less than about 20 mol % for acid resistance.

$Na_2O$ may form surface compressive stress by ion exchange and improve the meltability of glass. Na ions near the glass surface may be exchanged with K ions or the like through an ion exchange process. $Na_2O$ may not be contained. If $Na_2O$ is contained, the content of $Na_2O$ may be equal to or greater than about 1 mol % to effectively perform the above-described functions. If only a Li and Na ion exchange process is performed without a K ion exchange process, the content of $Na_2O$ may be equal to or less than about 8 mol % for smooth exchange between Li and Na ions. If a K ion exchange process is also performed, a larger amount of $Na_2O$ may be used. In this case, the content of $Na_2O$ may be equal to or less than about 20 mol % for acid resistance.

$K_2O$ may improve the ion exchange performance and may be associated with the breakage resistance. $K_2O$ may not be contained. The content of $K_2O$ may be equal to or greater than about 0.5 mol % to improve the ion exchange performance. To prevent an excessive decrease in breakage resistance, the content of $K_2O$ may be equal to or less than about 10 mol %.

MgO may increase the surface compressive stress and improve the breakage resistance of chemically strengthened glass. These functions can be effectively performed in case that the content of MgO is equal to or greater than about 3 mol %. The content of MgO equal to or less than about 20 mol % may be advantageous in reducing the occurrence of devitrification during glass melting.

CaO may improve the meltability and breakage resistance of glass. CaO may not be contained. To effectively perform these functions, the content of CaO may be equal to or greater than about 0.5 mol %. If the content of CaO is excessively high, the ion exchange performance may be degraded, and thus, the content of CaO may be equal to or less than about 20 mol %.

Similar to CaO, SrO may improve the meltability and breakage resistance of glass. SrO may not be contained. To effectively perform these functions, the content of SrO may be equal to or greater than about 0.5 mol %. If the content of SrO is excessively high, the ion exchange performance may be degraded, and thus, the content of SrO may be equal to or less than about 20 mol %.

BaO may improve the meltability and breakage resistance of glass. BaO may not be contained. To effectively perform these functions, the content of BaO may be equal to or greater than about 0.5 mol %. The content of BaO equal to or less than about 15 mol % may be advantageous in preventing an excessive decrease in ion exchange performance.

ZnO may improve the meltability of glass. ZnO may not be contained. ZnO may significantly exhibit the effect of improving meltability in case that the content of ZnO is equal to or greater than about 0.25 mol %. To prevent a decrease in weatherability, the content of ZnO may be equal to or less than about 10 mol %.

$TiO_2$ may improve the breakage resistance of chemically strengthened glass. $TiO_2$ may not be contained. $TiO_2$ may significantly exhibit the effect of improving breakage resistance in case that the content of $TiO_2$ is equal to or greater than about 0.1 mol %. To prevent devitrification during melting, the content of $TiO_2$ may be equal to or less than about 1 mol %.

$ZrO_2$ may increase the surface compressive stress due to ion exchange and improve the breakage resistance of glass. $ZrO_2$ may not be contained. $ZrO_2$ may effectively perform these functions in case that the content of $ZrO_2$ is equal to or greater than about 0.5 mol %. The content of $ZrO_2$ equal to or less than about 8 mol % may be advantageous in suppressing devitrification during melting.

The glass composition may further include components such as $Y_2O_3$, $La_2O_3$, $Nb_2O_5$, $Ta_2O_5$, and $Gd_2O_3$ in addition to the components mentioned above.

Subsequently, referring to FIGS. 11 and 13, the mother glass 100' may be machined to form a glass 100'_1 (step S20).

The mother glass 100' may be machined (or cut) in the first direction DR1 and the second direction DR2, as illustrated in FIG. 13. FIG. 13 illustrates that the mother glass 100' is cut into nine glasses 100'_1, but the disclosure is not limited thereto. For example, the number of glasses 100'_1 may be two to eight or greater than nine.

Figure 14:
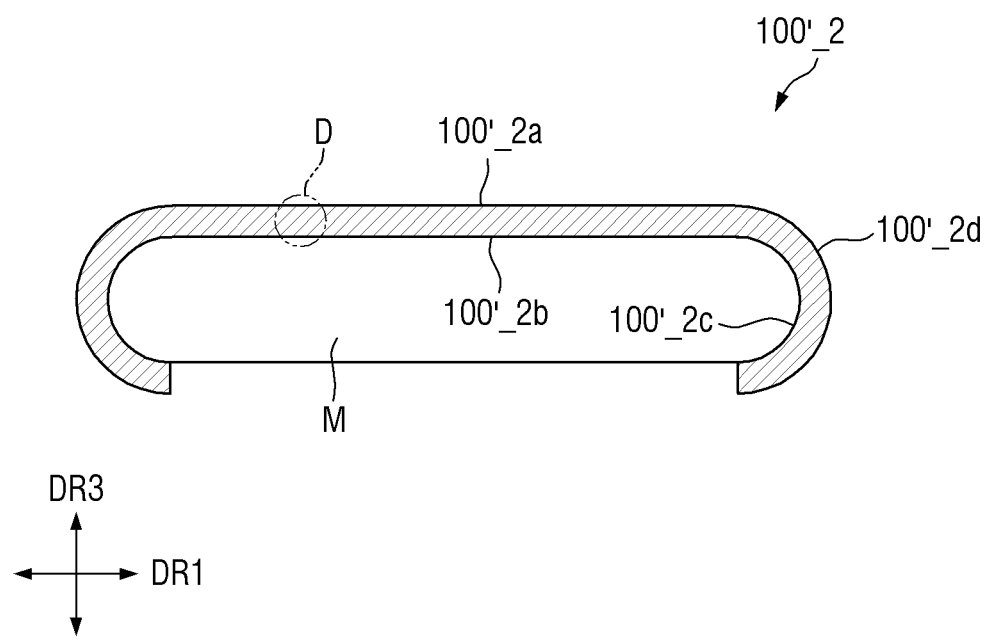
FIGS. 14, 20, 22, and 25 are schematic cross-sectional views, each of which illustrates a processing step of the method of manufacturing a glass article according to an embodiment.
Figure 15:
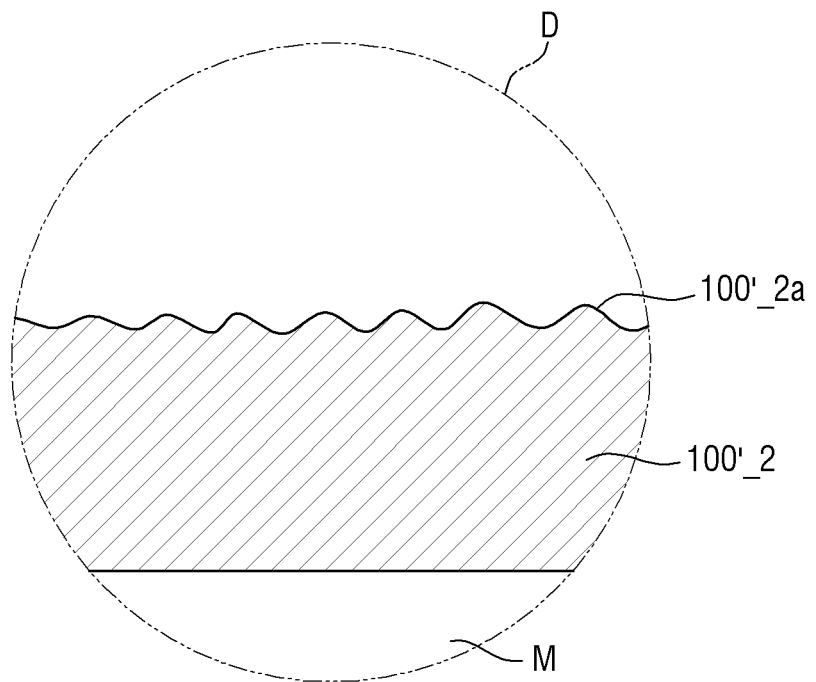
FIG. 15 is a schematic enlarged cross-sectional view of region D of FIG. 14.

Referring to FIGS. 11, 14, and 15, the machined glass 100' 1 may be thermoformed to form glass 100'_2 including the flat portion 110 (see FIG. 1), and the side portions 120 (see FIG. 1) extending from the flat portion 110 (step S30).

Unlike the flat portion 110, the side portion 120 may be bent in the third direction DR3. The side portion 120 may be bent from the flat portion 110. A bending angle θ of the glass 100'_2 may be defined as a crossing angle between an extension line of a surface (first surface 100' 2a described below) of the flat portion 110 and a tangent line at an end portion (end of the side portion 120 spaced from the flat portion 110) of the outer surface (fourth surface 100' 2d described below) of the side portion 120. The bending angle θ of the glass 100' 2 according to an embodiment may be an obtuse angle.

As described above, the glass 100'_2 may include multiple surfaces. The glass 100'_2 may include the first surface 100'_2a of the flat portion 110, a second surface 100'_2b opposite to the first surface 100' 2a, a third surface 100' 2c that is the inner surface of the side portion 120, and the fourth surface 100' 2d that is the outer surface of the side portion 120. The third surface 100' 2c may be connected to the second surface 100' 2b, and the fourth surface 100' 2d may be connected to the first surface 100'_2a.

In the process of forming the glass 100'_2 (step S30), irregularities may be formed on the surface of the glass 100'_2 by heat. Further, the bending angle of a mold M may be very small, and thus the cracks CR1 and CR2 may occur.

Figure 16:
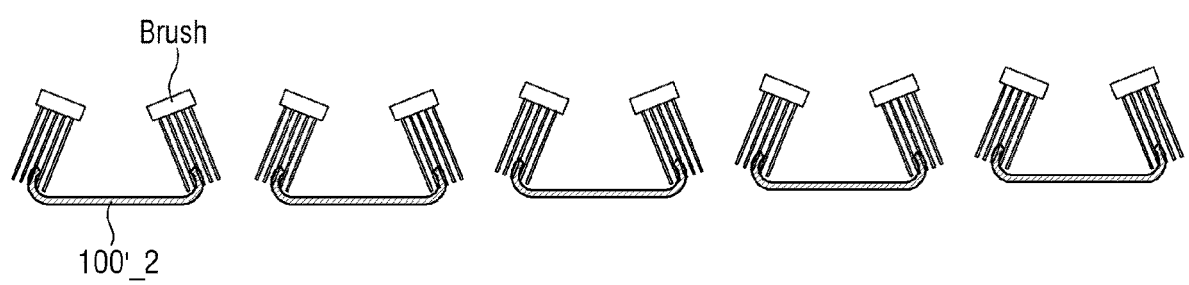
FIGS. 16 to 19, and FIGS. 23 and 24 are schematic perspective views illustrating processing steps of the method of manufacturing a glass article according to an embodiment.
Figure 17:
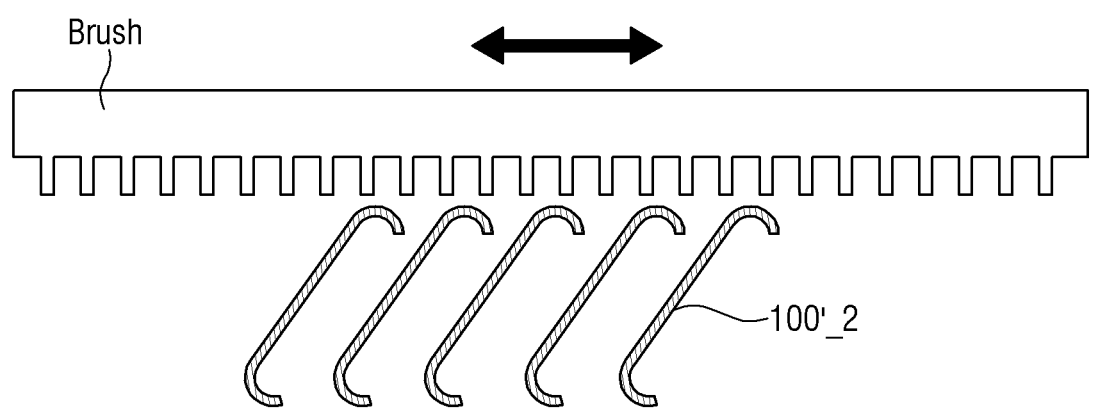
Figure 18:
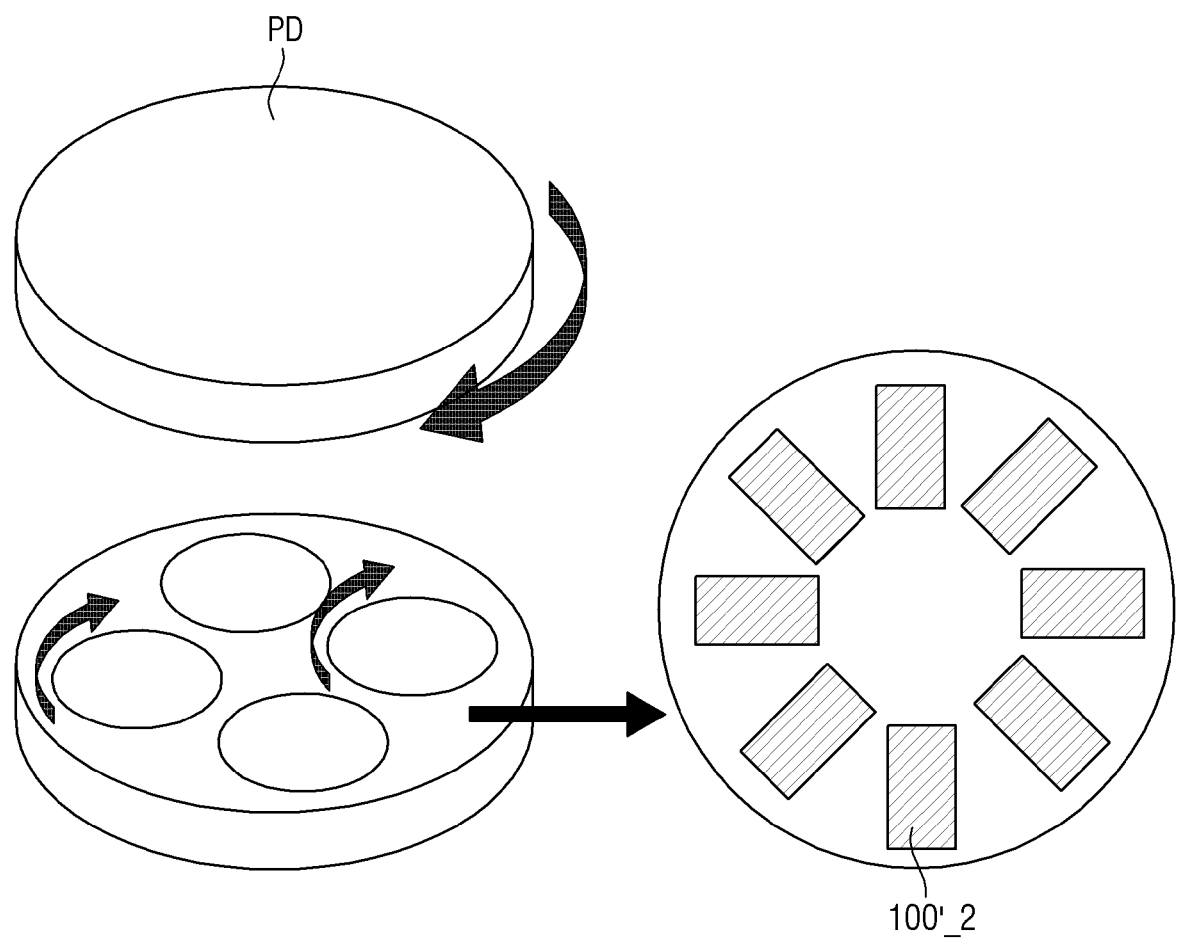
Figure 19:
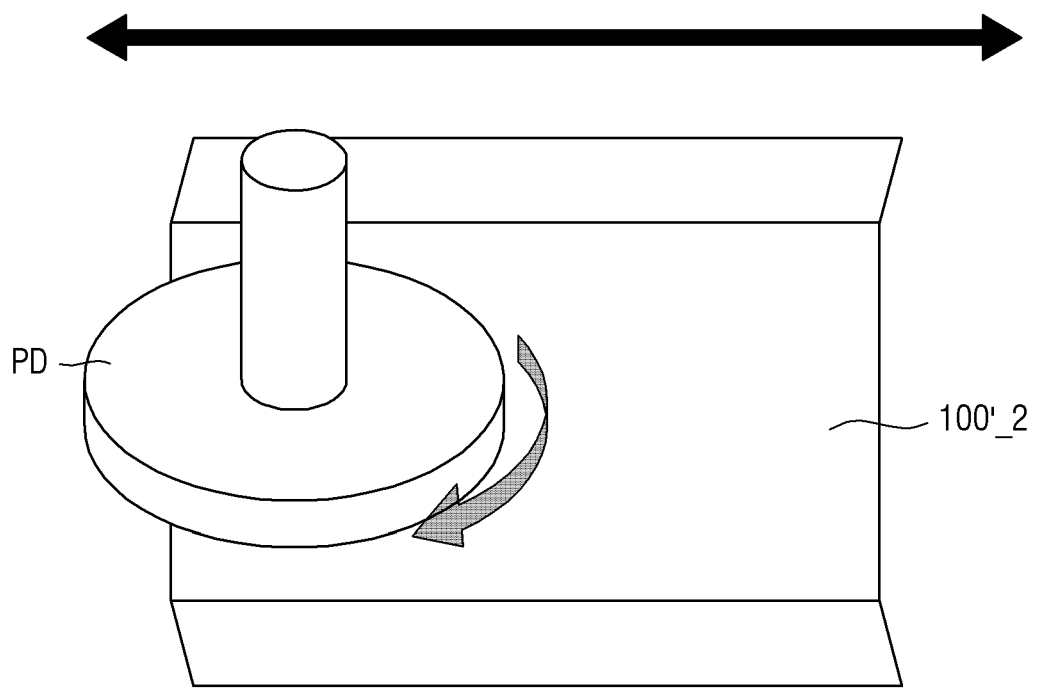

Subsequently, referring to FIG. 11 and FIGS. 16 to 19, the thermoformed glass 100'_2 may be subjected to the primary polishing process (step S40). FIG. 16 illustrates the primary polishing process for the third surface 100' 2c of the glass 100'_2, FIG. 17 illustrates the primary polishing process for the fourth surface 100' 2d of the glass 100'_2, FIG. 18 illustrates the primary polishing process for the first surface 100' 2a of the glass 100'_2, and FIG. 19 illustrates the primary polishing process for the second surface 100'_2b of the glass 100' 2.

In the primary polishing process, the surface irregularities formed in the process of forming the glass 100'_2 (step S30) may be removed.

However, in the process of removing the surface irregularities, cracks may occur due to foreign substances between a brush BR or a polishing device PD and the glass 100'_2. In other words, the factors that cause the cracks may be the foreign substances interposed between the brush BR or the polishing device PD and the glass 100'_2 in the primary polishing process, and the thermoforming process described above.

Figure 20:
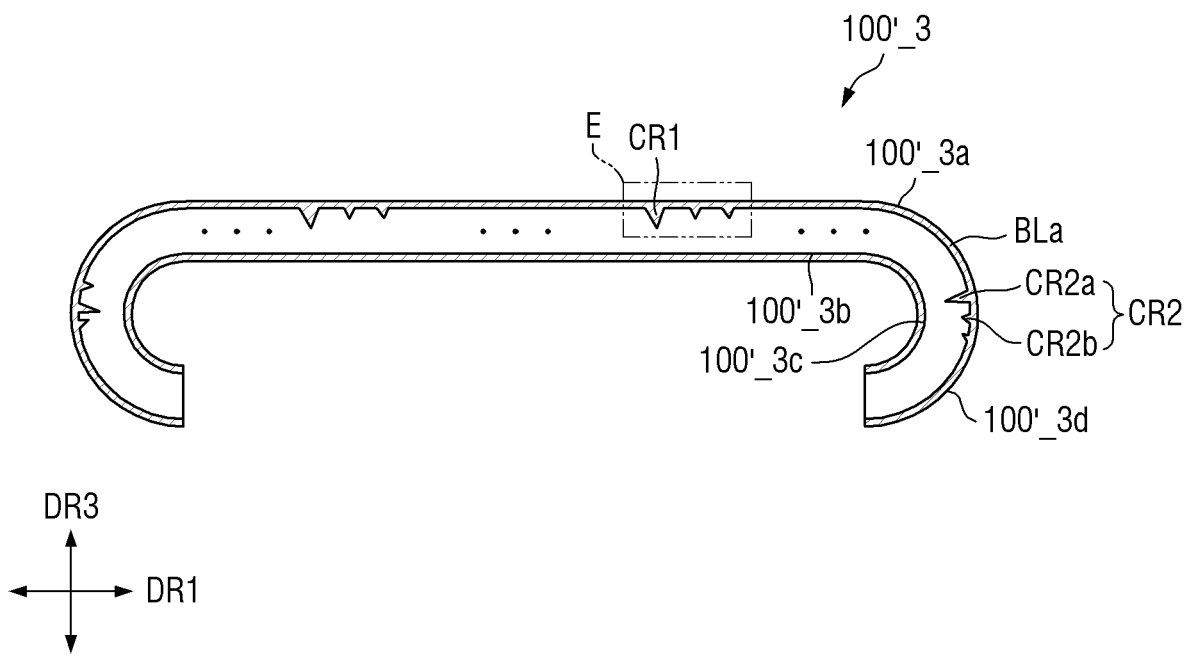
Figure 21:
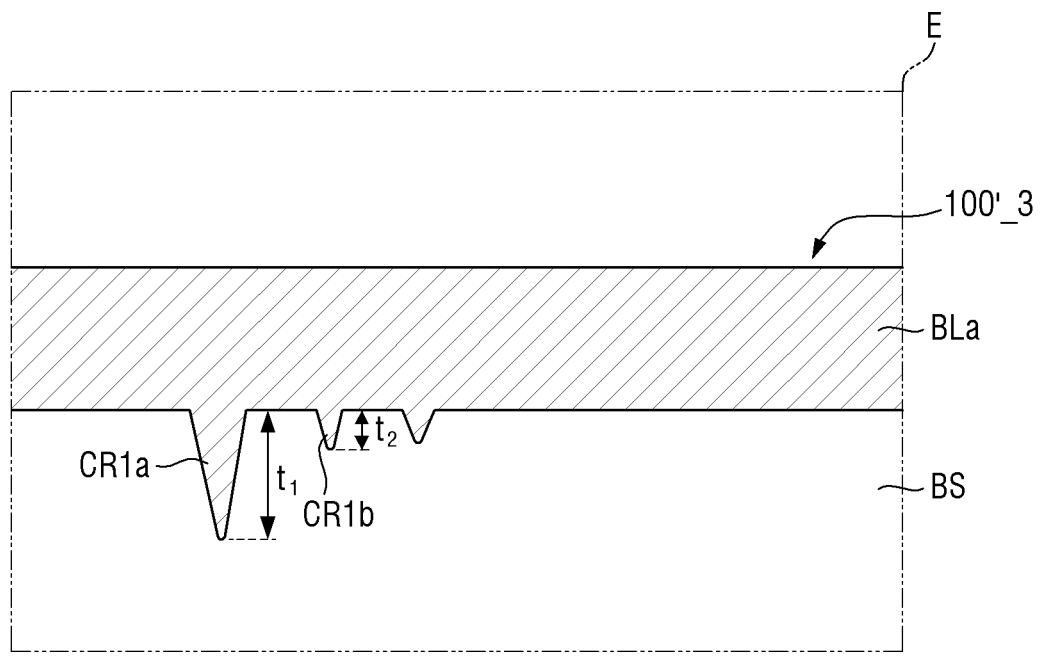
FIG. 21 is a schematic enlarged cross-sectional view of region E of FIG. 20.

Referring to FIGS. 20 and 21, cracks CR1a, CR1b, CR2a, and CR2b may occur in surfaces (first surface 100' 3a to fourth surface 100' 3d) of glass 100'_3, as described above. Heights t1 of a first-first crack CR1a and a second-first crack CR2a may be respectively greater than heights t2 of a first-second crack CR1b and a second-second crack CR2b.

Further, a Beilby layer BLa may be formed in the primary polishing process. The Beilby layer BLa may be an impurity layer formed by a reaction between surfaces (first surface 100'_3a to fourth surface 100' 3d) of a base BS and cerium (Ce) that is the component of the polishing liquid. The Beilby layer BLa may contain cerium (Ce). The Beilby layer BLa may have a refractive index greater than that of the base BS. The refractive index of the base BS may be generally about 1.5, and the refractive index of the Beilby layer BLa may be greater than that of the base BS.

The Beilby layer BLa may fill the cracks CR1a, CR1b, CR2a, and CR2b.

Figure 22:
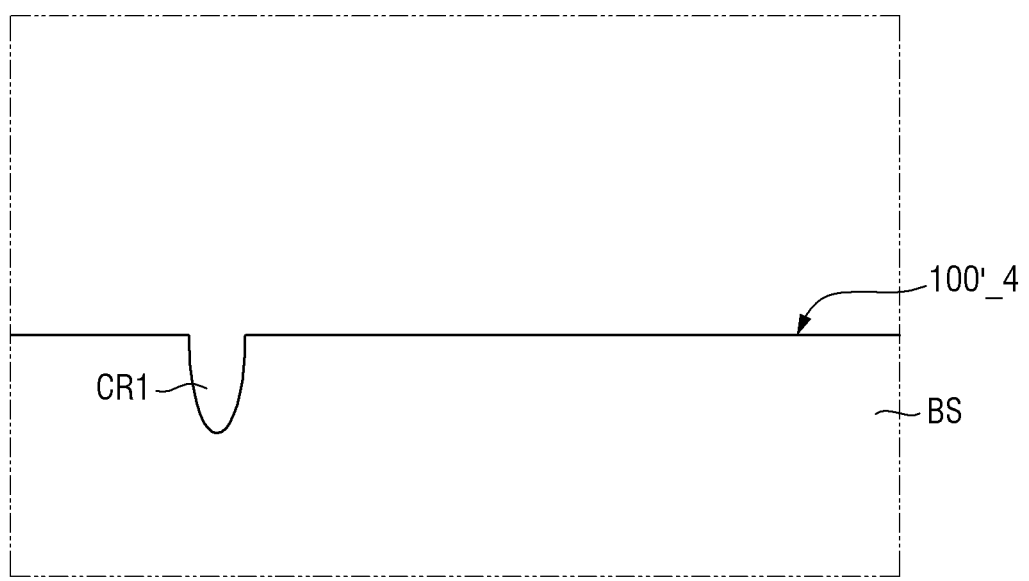

Subsequently, referring to FIGS. 11 and 22, the polished glass 100'_3 may be etched to form glass 100'_4 (step S50).

Through the etching (step S50), the Beilby layer BLa may be removed, the heights t1 of the first-first crack CR1a and the second-first crack CR2a may decrease, the widths (e.g., width in the first direction DR1) thereof may decrease, and the cross-sectional inclinations thereof may decrease (formation of the first crack CR1). Further, the first-second crack CR1b and the second-second crack CR2b may be removed.

However, the first crack CR1 formed through the etching (step S50) may be visually recognized from the outside. Although not shown, the second crack CR2 may also be visually recognized from the outside. The first crack CR1 and the second crack CR2 may cause the yield of the glass article to decrease.

Figure 23:
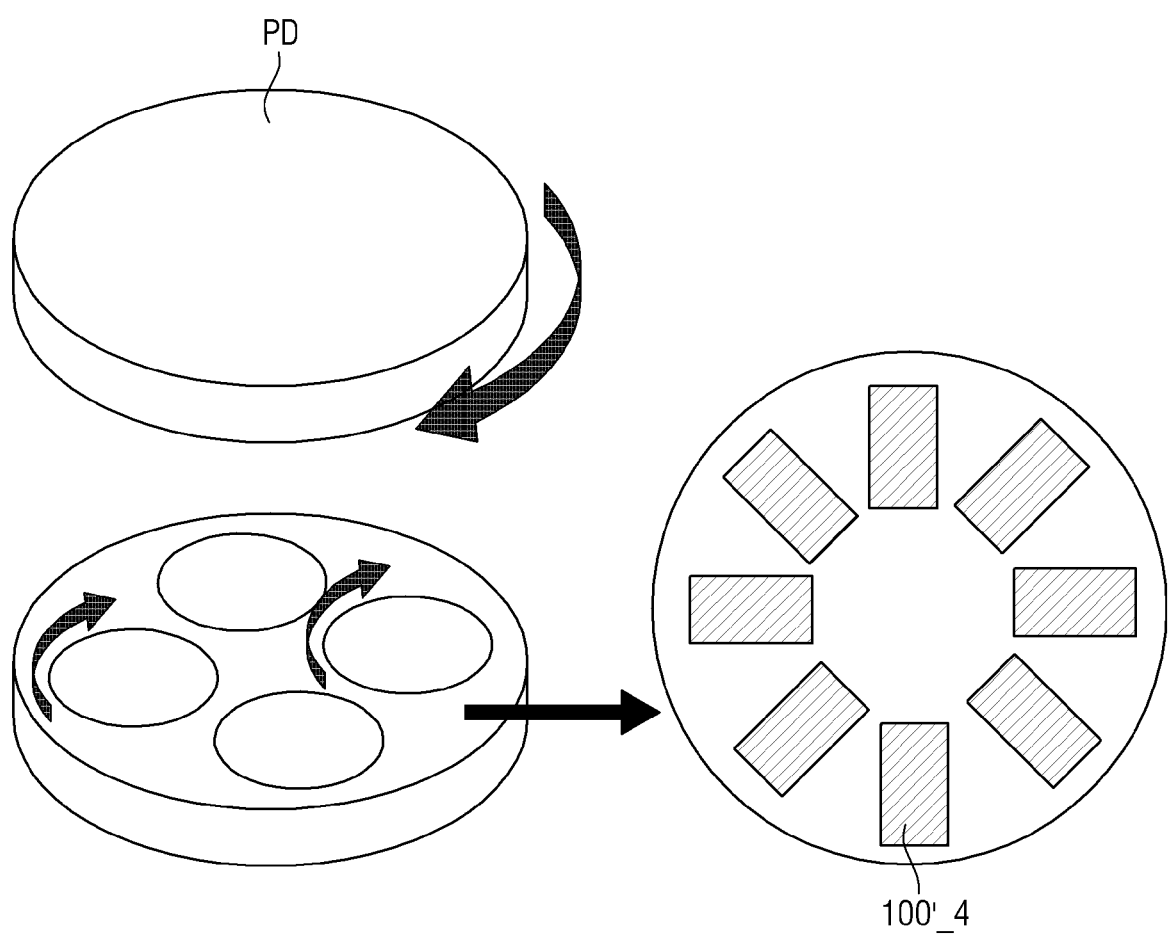
Figure 24:
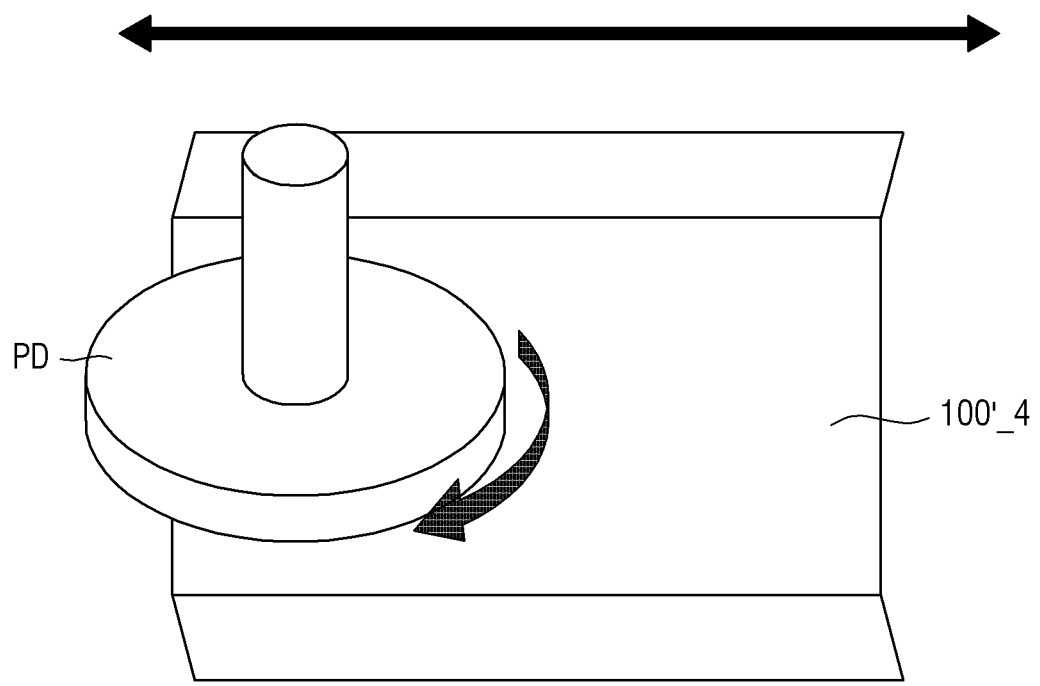
Figure 25:
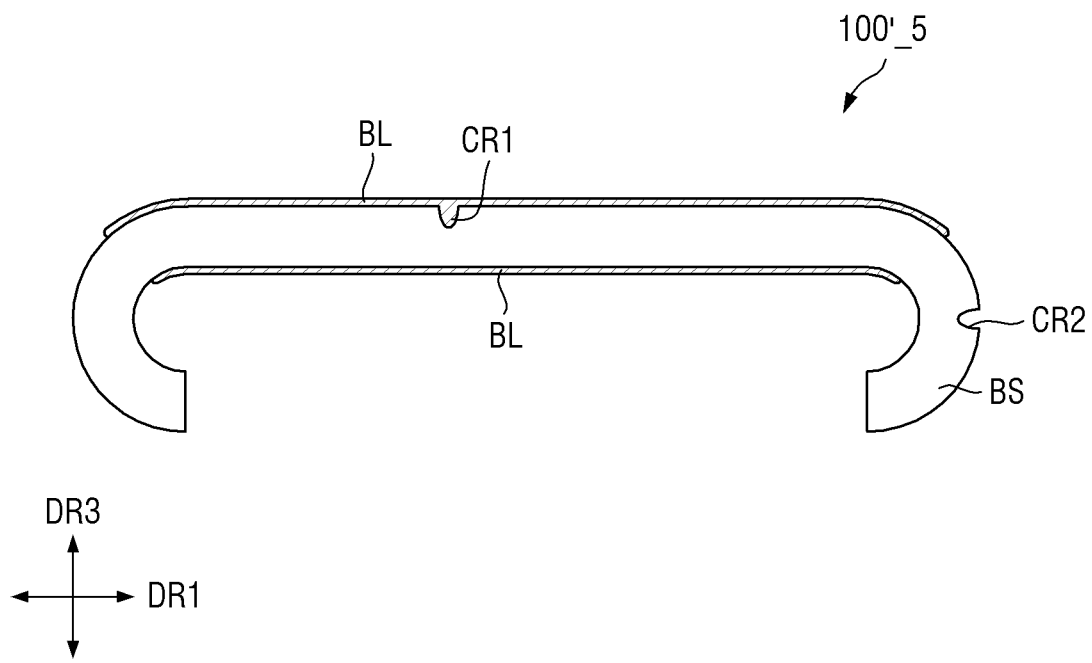

Next, referring to FIGS. 11 and 23 to 25, a flat portion of the etched glass 100'_4 may be subjected to the secondary polishing process to form glass 100'_5 (step S60). Specifically, as shown in FIGS. 23 and 24, the secondary polishing process (step S60) may be performed on first and second surfaces of the flat portion by using the polishing liquid and the polishing device PD as described with reference to FIGS. 18 and 19.

Through the secondary polishing process (step S60), the Beilby layer BL may be formed. The Beilby layer BL may be an impurity layer formed by a reaction between the surface of the base BS and cerium (Ce) that is the component of the polishing liquid. The Beilby layer BL may contain cerium (Ce). The Beilby layer BL may have a refractive index greater than that of the base BS. The refractive index of the base BS may be generally about 1.5, and the refractive index of the Beilby layer BL may be greater than that of the base BS. According to an embodiment, the refractive index of the Beilby layer BL may be greater than that of the base BS, and the Beilby layer BL may fill the first crack CR1 that may be visually recognized from the outside, thereby preventing the first crack CR1 from being visually recognized from the outside.

The Beilby layer BL may be disposed on a part of the side portion. As described later, the Beilby layer BL may be disposed on a partial region of the side portion adjacent to the flat portion. In a part of the side portion exposed by the Beilby layer BL, the second crack CR2 may be exposed. The Beilby layer BL may be entirely disposed on the flat portion, but may be partially disposed on the side portion because the secondary polishing process is performed only on the flat portion of the base BS, and the secondary polishing process may not be performed on the side portions of the base BS.

Subsequently, referring to FIG. 11, quality inspection may be performed on the glass 100'_5 (step S70).

Specifically, in the quality inspection for the glass 100'_5, if the first crack CR1 of the flat portion does not satisfy a first condition, the second polishing process (step S60) may be performed again. The first condition may be that in a scratch inspection, the width of the first crack CR1 is in a range of about 0.05 mm to about 0.15 mm, the length of the first crack CR1 is equal to or less than about 5 mm, and the number of the first cracks CR1 is equal to or less than five.

After the quality inspection (step S70) is performed, if the first condition has been satisfied, strengthening by ion exchange may be performed on the glass 100'_5.

The strengthening by ion exchange may include chemical strengthening. Chemical strengthening may be performed through an ion exchange process. The ion exchange process may be a process of exchanging ions in glass with other ions. By performing the ion exchange process, the ions at or near the surface of the glass may be replaced or exchanged with larger ions having the same valence or oxidation state. For example, in case that the glass contains a monovalent alkali metal such as Li+, Na+, K+ and Rb+, the monovalent cation on the surface thereof may be replaced by Na+, K+, Rb+, or Cs+ ions with a larger ionic radius.

Hereinafter, a display device according to an embodiment will be described. In the following embodiment, the same components as those of the above-described embodiment are denoted by the same reference numerals, and a description thereof will be omitted or simplified.

Figure 26:
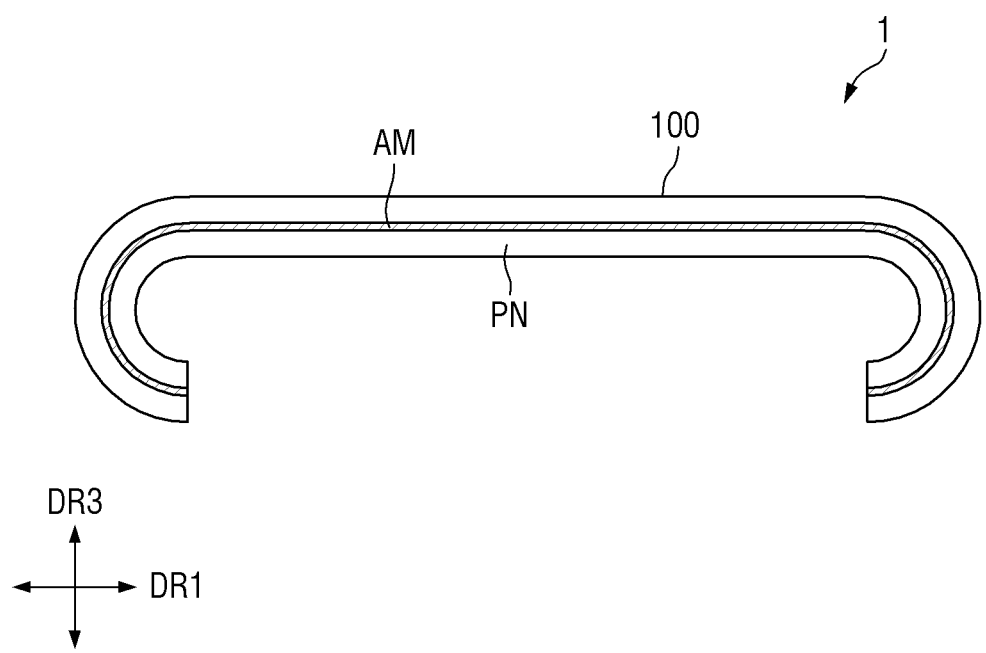
FIG. 26 is a schematic cross-sectional view of a display device including a glass article according to an embodiment.

FIG. 26 is a schematic cross-sectional view of a display device including a glass article according to an embodiment.

Referring to FIG. 26, a display device 1 may include a display panel PN and a cover window 100 disposed on the display panel PN. The cover window 100 may have substantially the same structure as the glass article 100 described above with reference to FIGS. 1 to 10, and thus a repetitive description will be omitted below.

The display panel PN and the cover window 100 may be attached via an adhesive member AM. The display panel PN may be disposed over the flat portion and the side portions of the cover window 100.

Examples of the display panel PN may include not only a self-luminous display panel such as an organic light emitting display (OLED) panel, an inorganic electroluminescence (EL) display panel, a quantum dot (QED) display panel, a micro-LED display panel, a nano-LED display panel, a plasma display panel (PDP), a field emission display (FED) panel, and a cathode ray tube (CRT) display panel, but also a light receiving display panel such as a liquid crystal display (LCD) panel and an electrophoretic display (EPD) panel.

The display panel PN may include pixels and may display an image by using light emitted from each pixel. The display device 1 may further include a touch member (not shown). In an embodiment, the touch member may be embedded in the display panel PN. For example, since the touch member is directly formed on a display member of the display panel PN, the display panel PN itself may perform a touch function.

Although some embodiments of the invention have been disclosed for illustrative purposes, those skilled in the art will appreciate that various modifications, additions and substitutions are possible, without departing from the scope and spirit of the disclosure.

What is claimed is:

1. A glass article comprising:
   a flat portion and a side portion that extends from the flat portion and is bent in a thickness direction of the glass article;
   a base disposed on the flat portion and the side portion; and
   a Beilby layer disposed on the flat portion and not disposed on at least a part of the side portion.

2. The glass article of claim 1, wherein a bending angle of the side portion is an obtuse angle.

3. The glass article of claim 1, wherein
   the flat portion includes a first surface, and a second surface opposite to the first surface,
   the side portion includes a third surface connected to the first surface, and a fourth surface connected to the second surface, and
   the Beilby layer is directly disposed on the first surface and the second surface.

4. The glass article of claim 3, wherein
   at least one of the first surface and the second surface of the flat portion includes at least one first crack indented in the thickness direction of the glass article, and
   the Beilby layer fills the at least one first crack.

5. The glass article of claim 4, wherein a refractive index of the Beilby layer is greater than a refractive index of the base.

6. The glass article of claim 4, wherein at least one of the third surface and the fourth surface of the side portion includes at least one second crack indented in the thickness direction of the glass article.

7. The glass article of claim 6, wherein
   a width of the at least one first crack of the flat portion is in a range of about 0.05 mm to about 0.15 mm,
   a length of the at least one first crack is equal to or less than about 5 mm,
   the at least one first crack comprises five or less first cracks,
   each of a width of the at least one second crack of the second side portion and a width of the at least one second crack of the third side portion is greater than about 0.15 mm,
   each of a length of the at least one second crack of the second side portion and a length of the at least one second crack of the third side portion is greater than about 5 mm, and
   the at least one second crack comprises two or more second cracks.

8. The glass article of claim 4, wherein
   the side portion includes:
   a first side portion adjacent to the flat portion;
   a second side portion connected to the first side portion and including at least one second crack; and
   a third side portion connected to the second side portion and including at least one second crack,
   the Beilby layer overlaps a part of the first side portion, and
   the at least one second crack of the second side portion and the at least one second crack of the third side portion are exposed to an outside.

9. The glass article of claim 1, wherein the Beilby layer includes cerium (Ce).

10. The glass article of claim 9, wherein a result of a ball drop test (BDT) on the glass article with a ball weight of 150 g is in a range of about 50 cm to about 80 cm.

11. The glass article of claim 1, wherein a result of a ball drop test (BDT) on the glass article with a ball weight of 150 g is equal to or greater than about 35 cm.

12. The glass article of claim 1, wherein
   the flat portion includes a first surface, and a second surface opposite to the first surface,
   the side portion includes a third surface connected to the first surface, and a fourth surface connected to the second surface,
   the side portion terminates at an end surface that connects the third surface to the fourth surface, and
   the Beilby layer is not disposed on the end surface.

13. The glass article of claim 1, wherein
the side portion includes a first area spaced apart from the flat portion, and
the glass article has a same thickness at a center of the flat portion and the first area of the side portion.

14. The glass article of claim 1, wherein the Beilby layer is disposed on only a part of the side portion, the part of the side portion adjacent to the flat portion.

15. A display device comprising:
a glass article including a flat portion and a side portion extending from the flat portion and bent in a thickness direction of the glass article; and
a display panel disposed on the flat portion and the side portion of the glass article,
wherein the glass article includes:
a base disposed on the flat portion and the side portion of the glass article, and
a Beilby layer disposed on the flat portion of the glass article and not disposed on at least a part of the side portion of the glass article.

* * * * *